Figure 1:
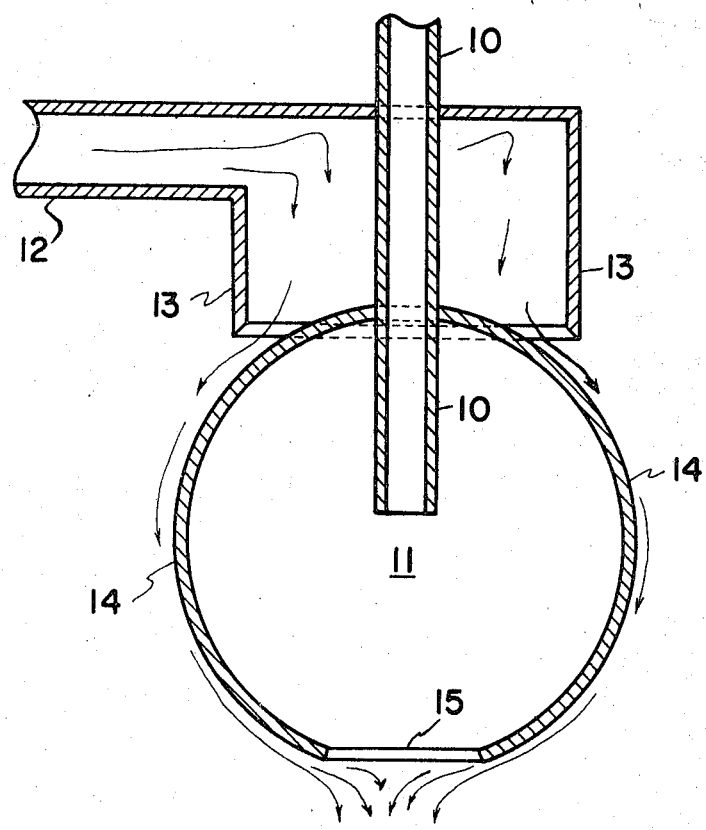

United States Patent

[11] 3,552,728

| [72] | Inventor | Francis A. Wisdom |
| | | Kemah, Tex. |
| [21] | Appl. No. | 589,573 |
| [22] | Filed | Oct. 26, 1966 |
| [45] | Patented | Jan. 5, 1971 |
| [73] | Assignee | Monsanto Company |
| | | St. Louis, Mo. |
| | | a corporation of Delaware |

[54] GAS SCRUBBING APPARATUS
5 Claims, 3 Drawing Figs.

[52] U.S. Cl. .................................................... 261/112
[51] Int. Cl. .................................................. B01d 47/02,
B01f 3/04, B01f 5/00
[50] Field of Search ........................................... 261/108–
—112, 158—161, 114; 55/240, 241; 98/115SB

[56] References Cited
UNITED STATES PATENTS

| 2,353,548 | 7/1944 | Dalton ........................ | 261/112X |
| 3,142,296 | 7/1964 | Love ........................... | 261/112X |
| 2,358,874 | 9/1944 | Mulloy ........................ | 261/112 |
| 2,813,361 | 11/1957 | Consolo ..................... | 40/106.23 |
| 2,829,032 | 4/1958 | Barley et al. ................ | 55/18X |
| 3,050,919 | 8/1962 | Tailor ......................... | 55/90 |
| 3,212,559 | 10/1965 | Williamson ................. | 159/13X |
| 3,378,238 | 4/1968 | Babington et al. .......... | 261/118X |
| 3,421,699 | 1/1969 | Babington et al. .......... | 261/115X |

FOREIGN PATENTS

| 158,990 | 1/1904 | Germany ..................... | 261/160 |
| 551,574 | 3/1943 | Great Britain ............... | 261/112 |
| 89,372 | 5/1921 | Switzerland ................. | 261/118 |

*Primary Examiner*—Ronald R. Weaver
*Attorneys*—M.N. Cheairs and Elizabeth F. Sporar ABSTRACT: An apparatus for scrubbing gases vented from analytical instruments. The scrubber has a vertical gas conduit and a chamber with a spheroidal exterior surface. A coaxial liquid conduit surrounds a portion of the vertical gas conduit so as to form an annular space between the gas conduit and the liquid conduit. The lower end of the gas conduit is in open communication with the chamber. The lower end of the liquid conduit is circular and lies in a single horizontal plane and opens in close proximity to the upper surface of the chamber. The spheroidal exterior surface of the chamber has a circular horizontal cross section and is axially aligned with the gas conduit and the liquid conduit. The diameter of the circular horizontal cross section varies constantly and uniformly in a nonlinear manner from the top of the chamber to the bottom of the chamber in such a manner as to make the exterior of the chamber widest at a point between the top and the bottom of the chamber. The bottom of the chamber has an opening the center of which lies on the common axis of the spheroidal exterior surface of the chamber and the gas and liquid conduits. The opening is of such a size that fluid flowing down the exterior surface of the chamber will come together to form a seal over the opening. The exterior of the chamber is widest at the midpoint between the bottom and the top of the chamber. The interior surface of the chamber conforms to the spherical shape of the interior surface of the chamber. The vertical gas conduit has a circular horizontal cross section and extends to the center of the chamber.

PATENTED JAN 5 1971  3,552,728

*INVENTOR.*
Francis A. Wisdom
BY
*M. N. Chaus*
ATTORNEY

GAS SCRUBBING APPARATUS

The present invention relates to an apparatus for scrubbing gases. More particularly, the present invention relates to an apparatus for scrubbing gases being vented from analytical instruments.

The removal of noxious fumes and harmful constituents from gases discharged from various types of analytical instruments has long been a problem and many types of systems have been devised for this problem. A typical solution has been to vent the gases from the analytical instruments into a container of water so that the gases are bubbled through water before reaching the atmosphere in order to remove any harmful and/or noxious fumes. While this method and others generally have been satisfactory from the standpoint of removal of the undesirable constituents in a gas, they have not proven satisfactory with respect to the effect on the instruments from which the gases are being vented. For example, if a vent tube from a gas chromatography system is being vented beneath the surface of water, any loss of pressure within the gas chromatography system can cause the water to be sucked into the instrument causing extensive damage. Also, the back pressure on an analytical system will vary depending on the depth of the vent tube beneath the surface of the water thus affecting the reproducibility and reliability of the readings of the particular analytical system.

It is an object of the present invention to provide an apparatus for the removal of undesirable constituents from gases without the foregoing disadvantages. It is further object of the present invention to provide an apparatus which is particularly useful for the scrubbing of gases exiting from an analytical instrument.

Figure 2:
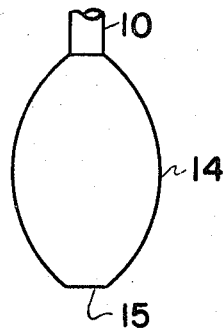
Figure 3:
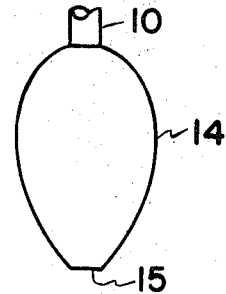

FIG. 1 is a sectional view of an apparatus according to the present invention. FIGS. 2 and 3 show shapes of the exterior surfaces of chambers useful in constructing the apparatus of the present invention. The same numbers are used throughout the drawings to designate similar features.

In one of its embodiments, the present invention is a gas scrubbing apparatus having a vertical gas conduit, a chamber having a spheroidal exterior surface, a coaxial liquid conduit surrounding a portion of said vertical gas conduit so as to form an annular space between said gas conduit and said liquid conduit, means to flow liquid downwardly through said annular space, the lower end of said gas conduit being an open communication with said chamber, the lower end of said liquid conduit being circular and lying substantially in a single horizontal plane and opening in close proximity to the upper exterior surface of said chamber, the spheroidal exterior surface of said chamber having a circular horizontal cross section and being axially aligned with said gas conduit and said liquid conduit, the diameter of said circular horizontal cross section varying constantly and uniformly in a nonlinear manner from the top of said chamber to the bottom of said chamber in such a manner as to make the exterior of said chamber widest at a point between the top and the bottom of said chamber, the bottom of said chamber having an opening the center of which lies on the common axis of said spheroidal exterior surface of said chamber and said gas and liquid conduits, said opening being of such a size that fluid flowing down the exterior surface of said chamber will come together to form a seal over said opening.

Referring to FIG. 1 in order to illustrate operation of the present invention, gases to be scrubbed pass downwardly through vertical gas conduit 10 and exit from the lower end of vertical gas conduit 10 into chamber 11. Water or other suitable scrubbing liquid enters through line 12 and flows into and through the annular space between vertical gas conduit 10 and vertical liquid conduit 13 from whence it flows via the lower end of liquid conduit 13 onto the upper exterior surface 14 of chamber 11. The flow of the water passing from the lower end of liquid conduit 13 and onto the exterior surface 14 of chamber 11 is regulated so as to cause an even flow of water over the entire exterior surface 14 of chamber 11. Because of the particular configuration of the exterior surface 14 of chamber 11, the water comes together at the bottom of chamber 11 so as to form a liquid seal over circular hole 15. The arrows indicate the flow of the liquid over the exterior surface 14 of chamber 11. The gases which have entered chamber 11 through gas conduit 10 exit through hole 15 in the bottom of chamber 11 and pass through the seal formed by the water whereby they are scrubbed of harmful constituents such as acid, etc. before going to the atmosphere. By this arrangement, a practically constant back pressure on the vent line to which the apparatus of the present invention is attached is assured. Also no liquid will back up in the vapor line when there is no vapor flow.

The chambers useful in the present invention may vary somewhat in the configuration of the spheroidal exterior surface; however, they should be similar to those shown in the figures. The spheroidal exterior surface must have a substantially circular horizontal cross section which is constantly varying from the top of the chamber to the bottom of the chamber with the diameter of the widest portion of the exterior of the chamber being somewhere between the top and the bottom of the chamber. Generally, the widest portion of the exterior of the chamber will occur in the middle one-third of the height of the chamber although it is preferred that the widest portion of the chamber's exterior be at about the midpoint of the top and the bottom. The spheroidal exterior surface should also vary uniformly in a nonlinear manner from the top of the chamber to the bottom so that a smooth continually curving surface is provided for the scrubbing liquid to flow over.

The exterior surface of the chambers useful in the present invention must be constructed so that a liquid flowing down the outside will cling to the surface and form a seal across the hole in the bottom of the chamber. Generally, the exterior surface of the chambers should be constructed so that the ratio of the height of the exterior of the chamber to the width of the exterior of the chamber at its widest portion is maintained between the limits of about 0.7:1 to 2:1 but will generally vary from about 0.9:1 to 1.7:1. It is especially preferred that such ratio of height to width be within the range of 1.5:1 to 1/1. The chamber shown in FIG. 1 is a most useful embodiment of the present invention and has an essentially spherical exterior surface; thus having a ratio of its height to its maximum width of about 1/1.

FIGS. 2 and 3 illustrate other configurations of the chambers of the apparatus of the present invention. The exterior surface 14 of the chamber of FIG. 2 is constructed so that its widest portion, $w$, is essentially at the midpoint between the top and the bottom of the chamber. The ratio of the height of the chamber, $h$, to the width is approximately 1.5:1. The exterior surface 14 of the chamber of FIG. 3 illustrates that the widest portion of the chamber may occur at a point other than the midpoint between the top and the bottom of the chamber. Here the spheroidal exterior surface has its widest portion slightly above the midpoint but chambers whose exterior surfaces have their widest portions below the midpoint are also operative.

The chambers of the apparatus of the present invention as defined by the interior surfaces of their walls may be of various shapes. Generally the chambers will have walls of uniform thickness so that the interior surface of the chamber conforms in shape to that of the exterior surface. This is the case in the apparatus illustrated in FIG. 1 where both the chamber (as defined by its interior walls) and the exterior surface are substantially spherical.

The opening in the bottom of the chamber is preferably circular; however, it could be other shapes such as elliptical, square, triangular, rectangular, etc. In any case, the ratio of the greatest width or the diameter of the opening to the width of the exterior surface of the chamber at its widest portion should be less than 0.5:1 in order for the scrubbing liquid to form a seal over the opening. The lower limit on the size of the opening depends on the flow rate of the gas being scrubbed but generally the ratio of the greatest width or the diameter of this opening to the width of the exterior of the chamber at its widest portion will be in the range of 0.1:1 to 0.5:1.

The vertical gas conduit of the apparatus of the present invention may have various shaped cross sections; however, it is preferred that it have a circular horizontal cross section. All that is required is that this vertical gas conduit extend into the interior of the chamber; however, it will generally extend to somewhere in the upper two-thirds of the chamber. For best results, the lower end of the gas conduit will be at about the center of the chamber. The vertical liquid conduit surrounding the vertical gas conduit must have a lower end which has a circular cross section and it is preferably that the parts of the liquid conduit other than the lower end have a circular cross section. The ratio of the diameter of the lower end of the liquid conduit to the diameter of the exterior surface of the chamber at its widest portion should be within the range of about 0.3:1 to about 0.7:1 with best results being obtained within the range of 0.4:1 to 9.6:1. The distance between the lower edge of the liquid conduit and the upper exterior surface of the chamber can vary somewhat depending on the flow of liquid which is to pass between the lower end of the liquid conduit and the exterior surface of the chamber. This distance is preferably about one-sixteenth inch but can vary from about one thirty-second second inch and lower to about one-eighth inch and higher.

The apparatus of the present invention may be constructed of either synthetic resins such as polyethylene, nylon, acrylic resins, etc., or of metals such as iron, magnesium, aluminum and tin. Those of polyethylene are preferred.

An apparatus was constructed as in FIG. 1 wherein both the interior surface and the exterior surface of the chamber were substantially spherical with a maximum outside diameter of about 2¼ inches. The vertical liquid conduit at a diameter of about 1 inch with its lower end approximately one-sixteenth inch from the exterior surface of the chamber while the vertical gas conduit consisted of ¼-inch tubing connected at its upper end to the vent of a process gas chromatograph. The opening in the bottom of the chamber was approximately five-eighths inch. Water flowing through the vertical liquid conduit and over the surface of the chamber at the rate of about 0.5 gallons per minute provided a seal over the opening in the bottom of the chamber sufficient to scrub the gas being vented from the chromatograph of harmful constituents.

I claim:

1. A gas scrubbing apparatus having a vertical gas conduit, a chamber having a spheroidal exterior surface, a coaxial liquid conduit surrounding a portion of said vertical gas conduit so as to form an annular space between said gas conduit and said liquid conduit, means to flow liquid downwardly through said annular space, the lower end of said gas conduit being in open communication with said chamber, the lower end of said liquid conduit being circular and lying in a single horizontal plane and opening to the upper exterior surface of said chamber, the spheroidal exterior surface of said chamber having a circular horizontal cross section and being axially aligned with said gas conduit and said liquid conduit, the diameter of said circular horizontal cross section varying constantly and uniformly in a nonlinear manner from the top of said chamber to the bottom of said chamber in such a manner as to make the exterior of said chamber widest at a point between the top and the bottom of said chamber, the bottom of said chamber having an opening the center of which lies on the common axis of said spheroidal exterior surface of said chamber and said gas and liquid conduits, said opening being of such a size that fluid flowing down the exterior surface of said chamber will come together to form a seal over said opening.

2. The gas scrubber of claim 1 wherein the exterior of said chamber is widest at the midpoint between the bottom and the top of said chamber.

3. The gas scrubber of claim 2 wherein the interior surface of said chamber conforms to the shape of the exterior surface of said chamber.

4. The gas scrubber of claim 2 wherein said vertical gas conduit has a circular horizontal cross section and extends to the center of said chamber.

5. The gas scrubber of claim 1 wherein the exterior surface of said chamber is spherical.